Oct. 27, 1970   L. F. FRANK   3,536,434

EFFICIENT OPTICAL SYSTEM

Filed June 8, 1966   2 Sheets-Sheet 1

LEE F. FRANK
INVENTOR.

BY

ATTORNEYS

Oct. 27, 1970  L. F. FRANK  3,536,434

EFFICIENT OPTICAL SYSTEM

Filed June 8, 1966  2 Sheets-Sheet 2

LEE F. FRANK
INVENTOR.

BY
ATTORNEYS

United States Patent Office 3,536,434
Patented Oct. 27, 1970

3,536,434
EFFICIENT OPTICAL SYSTEM
Lee F. Frank, Rochester, N.Y., assignor to Eastman Kodak Company, Rochester, N.Y., a corporation of New Jersey
Filed June 8, 1966, Ser. No. 556,032
The portion of the term of the patent subsequent to Nov. 5, 1985, has been disclaimed
Int. Cl. G02b 5/14, 17/00, 23/12
U.S. Cl. 350—202                5 Claims

ABSTRACT OF THE DISCLOSURE

An optical system for forming images is disclosed in which the optical efficiency of the system is increased by causing an objective (lens or reflector) to operate at a smaller field but larger aperture than its given field and aperture. This is accomplished by having at least two plane reflectors, one in the object space and the other in the image space, associated with the objective. The objective receives light from the object and forms a real image thereof in the image space. A plane reflector also receives light from the object and reflects it to the objective. This second beam passes through the objective or is reflected by a second mirror or plane reflector into focus in register with the real image formed by the objective alone.

---

This invention relates to optical systems for forming images.

It is the object of the invention to increase the optical efficiency of an optical objective system. That is, the object of the invention is to cause an objective (lens or reflector) operating at a given relative aperture to act as if it were operating at a larger relative aperture.

All objectives including both lenses and reflectors are designed to cover some specified angular field and to have some specified maximum relative aperture. An objective is an optical system which receives light from an object and forms a real image thereof. The present invention converts a lens which operates at a given field and aperture to one operating at a smaller field but larger aperture. In a sense, it sacrifices field for aperture. For example, an f/8 lens covering 30° half-angle is, by one embodiment of the present invention, made to cover only 10° half-angle but the amount of light transmitted by the system is equivalent to about f/3.5 or even more.

Cross reference is made to my co-filed applications Ser. No. 556,107, "Compact Document Copier" and Ser. No. 556,215, "Optical Systems with Axial Mirror both of which were filed June 8, 1966.

The aforementioned applications have issued, respectively, as U.S. Pats. 3,451,752 and 3,409,354.

The present invention can be used with either positive lenses or concave reflectors or combinations of lenses and reflectors which form images. When used with lenses it can operate at various magnifications although the system becomes large and unwieldy as the ratio of the conjugates becomes larger. It is most useful at 1:1 magnification and is practical up to 4:1, even 10:1 or slightly larger.

In those embodiments which employ a reflector lens and in those embodiments which employ a mirror on the optical axis of the system, the most useful embodiments of the invention operate strictly at 1:1 magnification. It is well known that there is a great demand for optical systems which efficiently form images at 1:1 magnification. For example document copying equipment, either of the scanning type or the over-all exposure type, require the copy to be about the same size as the original and can use such optical systems most effectively.

The above-described objects are accomplished by having at least two plane reflectors, one in the object space and the other in the image space associated with the objective. The objective itself receives light from the object and forms a real image thereof in the image space. According to the invention, a plane reflector also receives light from the object and reflects it to the objective. This second beam passes through the objective, when the objective is a lens, or is reflected by the objective when the objective is a mirror. This second beam from the objective is then reflected by a second mirror or plane reflector into focus in register with the image formed by the objective alone. In the case of a lens objective, the ratio preferred of the distance of the mirror in the object space from the optic axis to the distance of the mirror in the image space from the optic axis is the same as the ratio of size of the object to image. That is, at 2:1 magnification, the image mirror is twice as far from the optic axis as the object mirror.

At 1:1 magnification, the preferred lens embodiment of the invention has two mirrors parallel to the axis in the object space, and these same mirrors extend past the lens into the image space to form two mirrors in the image space. Thus, the lens is symmetrically located between parallel plates. In the embodiment which employs a reflector, such as a concave mirror, such a symmetrical arrangement allows the light to be reflected first from one mirror to the concave reflector and then from the second mirror into focus at the image. It does not matter which mirror the light hits first; both mirrors act as object space mirrors and as image space mirrors.

Certain embodiments of the invention employing a lens at unit magnification have more than two mirrors. For example a square tube of mirrors allows the invention to operate in both azimuths relative to the optic axis and theoretically increases the efficiency of the system by a factor of nine or even more while cutting the field coverage by the lens to one-third of its maximum angle. In actual practice, using a solid square bar of methylmethacrylate plastic, I have reached an increased efficiency factor of twenty-two. Since the plastic was slightly absorbing (it had a slight dye in it for stabilizing against ultra-violet damage) and the light passed through about 24-inch of the plastic, it is believed that better (i.e., more transparent) plastic would give a factor up to 30. Another embodiment employs a triangular tube of mirrors in the object space and a similar but inverted triangular tube of mirrors in the image space.

In the embodiments of the invention which have an axial mirror (i.e., a plane mirror lying on the optic axis of the lens or mirror), the light is always reflected once so that the image is not inverted relative to the object. Such an embodiment also has a second mirror in both the object space and in the image space, normally in the form of a single reflector parallel to the axial mirror. This latter embodiment is described in greater detail in the second of the two co-filed applications mentioned above.

Other objects and advantages of the invention will be more fully understood when read in connection with the accompanying drawings, in which:

FIG. 1 schematically illustrates the operation of the invention.

FIGS. 2, 3, 4 and 5 similarly illustrate preferred embodiments of the invention operating at unit magnification.

Figure 1:
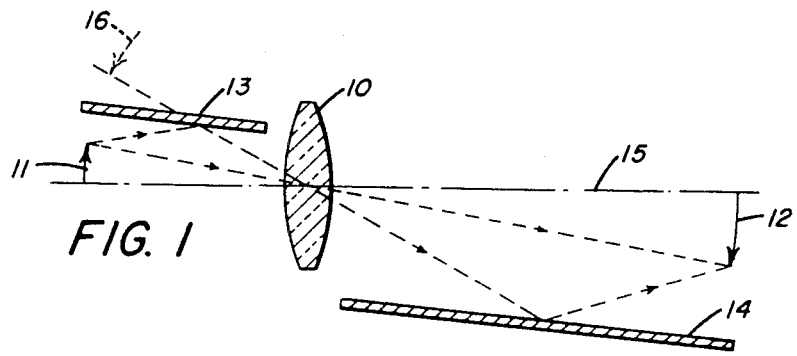

In FIG. 1 an objective 10 receives light from an object 11 and forms an image 12 thereof, at a magnification of about two. The objective 10 is customarily one designed to have a flat field, but to illustrate the universality of the invention, the object 11 and image 12 are shown curved. In addition to the light beam from the object 11 which is focused directly by the objective 10, a second beam of light is reecived according to the invention, by a plane mirror 13 located to one side of the first light beam as it leaves object 11. This second beam is reflected through the lens 10 to a second plane mirror 14 which again reflects the beam to focus in register on the image 12. To illustrate the operation of the invention, the virtual image 16 of the object 11 as seen in the mirror 13 is shown in broken lines. The lens 10 must have a wide enough field to pick up light from the virtual image 16. In this FIG. 1 it will be noted that the mirror 14 is effective at about twice the distance from the axis 15 as is the mirror 13. In the preferred embodiments of the invention, the mirrors 13 and 14 are parallel to the optic axis but are shown at an angle thereto, to illustrate the universality of the invention. The obliquity of the mirrors is independent of the magnification and the mirrors can be parallel to the axis at all magnifications. The mirrors 13 and 14 are always parallel to each other. At unit magnification they are the same distance from the optic axis. When the magnification is greater than 10:1, the mirror 14 is at ten times the distance from the axis as is the mirror 13 and is roughly ten times as large and hence unwieldy. Accordingly, as a practical matter, there is a general upper limit to the magnification at which the present invention is useful commercially. The most practical application of the invention is at unit magnification. Accordingly the various preferred embodiments of the invention will be described in connection with unit magnification systems.

Figure 2:
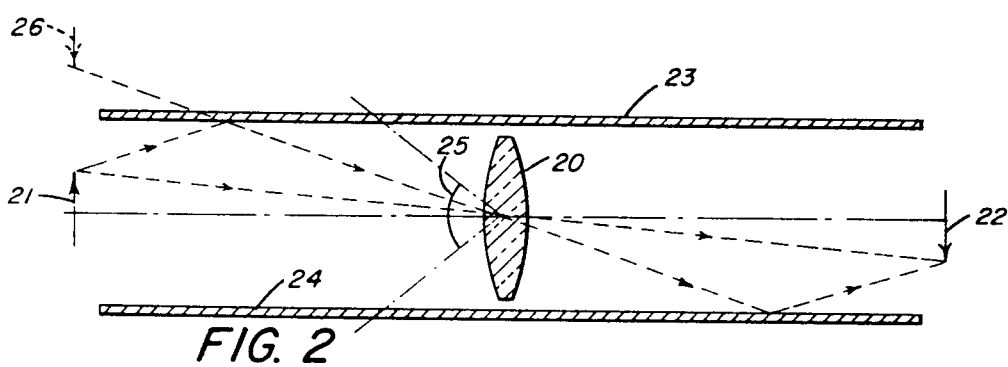

In FIG. 2 the positive lens or objective 20 receives light from an object 21 and forms an image 22 thereof. Plane mirrors 23 and 24, parallel to the optic axis of the lens 20, extend through both the object space and the image space. Light from the object 21 reflected by the mirror 23 in the object space passes through the objective 20 and is then reflected by the mirror 24 in the image space before coming to focus on the image 22. Similarly light striking the mirror 24 in the object space is reflected by the mirror 23 in the image space. Theoretically light can be reflected by both the mirror 23 and the mirror 24 in the object space and then reflected again by each mirror in the image space, but since this involves light arriving at the lens 20 from a very wide angle, it is normally cut off by the lens mount, not shown in this particular FIG. 2. That is, any objective has a definite field coverage indicated by the angle 25 in FIG. 2. In the present case this angle 25 is wide enough to receive light from the virtual image 26 of the object 21 as seen in the mirror 23. There are of course multiple images of the object 21 in the parallel mirrors 24, but the lens 20 is such that it receives light only from the object 21 and the two adjacent virtual images namely, 26 as seen in mirror 23 and the corresponding one as seen in mirror 24. Roughly speaking, the angle 25 is three times the angle subtended by the total object field extending from the mirror 23 to the mirror 24 at the object plane 21. Also there is about three times as much light passing through the objective 20 to form the image 22 as comes directly from the object 21. Actually the amount of light is not this great since the mirrors 23 and 24 are not 100% reflecting and lenses tend to fall off in efficiency toward the edges of their field. Nevertheless for an understanding of the invention, one can consider a field coverage (represented by angle 25) reduced to one-third and the total light transmitted increased by about three. When one comes to the square embodiment shown in FIGS. 6 and 7, discussed below, the field coverage is still only reduced to one-third but the reduction is in both azimuths and the amount of light is increased roughly by a factor between five and nine.

Figure 3:
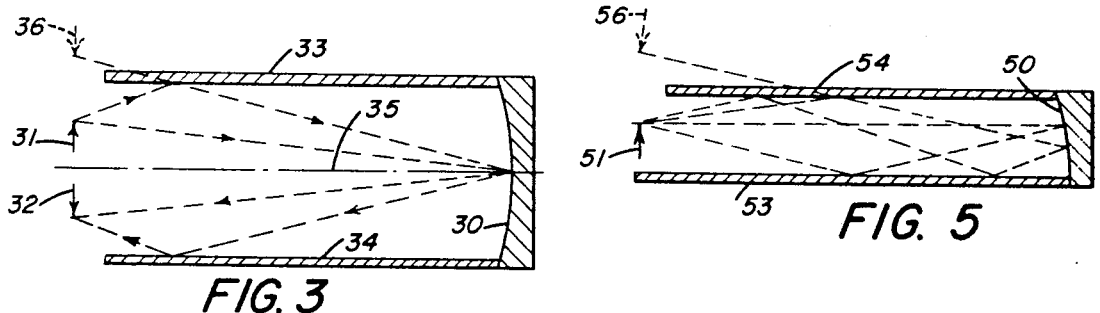

FIG. 3 illustrates a special embodiment of the invention in which the objective is in the form of a concave reflector 30 with the object 31 and image 32 both in a plane at the center of curvature of the spherical concave reflector 30. Light from the object 31 is focused directly to form the image 32. A second beam of light from the image 31 is reflected by the mirror 33 before striking the concave reflector 30 and afterwards is reflected by the mirror 34 into focus at the image 32. Again the virtual image 36 of the object 31 as seen in the mirror 33 is illustrated by broken lines to indicate the fact that concave reflector 30 must cover a wider field than occupied by the object itself.

One form of this embodiment of the invention is used in the preferred embodiments of the compact document copier described in the first of the above identified co-filed applications. The mirrors 33 and 34 are parallel to the optic axis 35 of the concave reflector 30 and are normally much wider than the concave reflector 30. As shown in FIG. 3, the object and image are on opposite sides of the optic axis 35. If the object 31 extends through the optic axis 35, the image also extends through this point and the optical system would not be convenient to use. However, it is not necessary that the displacement of the object 31 from the optic axis 35 be in the direction of one of the mirrors. It may be offset from the optic axis 35 in any direction. For example, the object 31 can be below the page seen in FIG. 3 in which case the image 32 would be equally spaced above the page.

Figure 5:
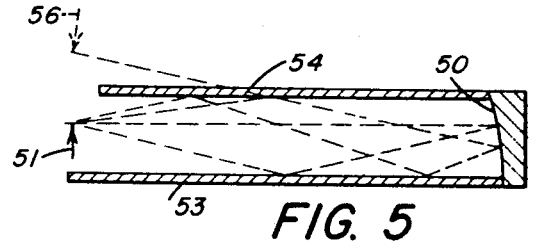
Figure 4:
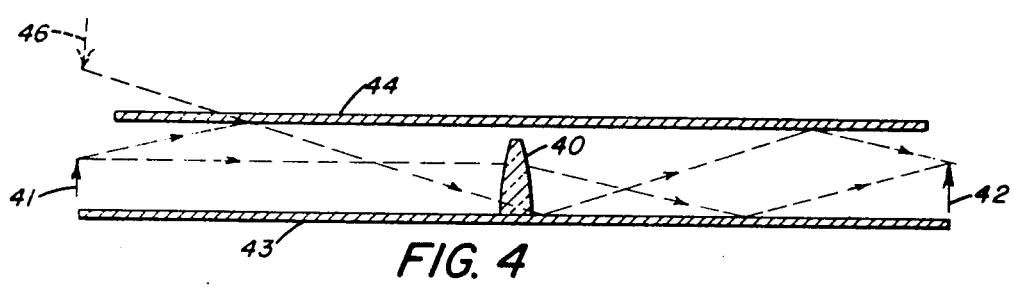

In the embodiments so far described, the plane reflectors have all been located to one side of the main beam of light passing through the objective from the object to the image. There are, however, special embodiments of the invention described in more detail in the second of the above-identified co-filed applications, namely the one entitled "Optical Systems with Axial Mirror." In these embodiments as illustrated in FIGS. 4 and 5 of the present application, there is a plane reflector lying precisely on the optic axis of the objective. In FIG. 4, the objective is a lens. In FIG. 5 it is a reflector. Any reflecting lens can include one or more lens elements, of course, in addition to the reflecting surface.

In FIG. 4 the half lens 40 receives light from an object 41 and forms an upright image 42 thereof with the help of an axially located plane reflector 43. That is, the light from the object 41 is reflected by the mirror 43 either before it reaches the half lens 40 or after it passes through the half lens 40 before coming into focus to form image 42. This is true whether or not there is an additional mirror according to the present invention to add efficiency to the system. According to the invention of the present application, an additional mirror 44 is positioned parallel to the mirror 43 to reflect the light at least once in the object space and at least once in the image space as it passes from the object 41 to the image 42. Again, the virtual image of the object 41 as seen in the mirror 44 is shown in broken lines at 46. It should be noted that in this embodiment of the invention the light from the object 41 is always reflected an odd number of times. Hence the image 42 is upright. This has several advantages including the ability to optically segment the object by a plurality of systems and to integrate the image thereof as described in detail in the co-filed application on axial mirrors. In FIG. 4, two rays are shown, one reflected once by the mirror 43 and the other reflected both twice by the mirror 44 and once by the mirror 43. The present invention is directed to the increasing of the optical efficiency of this system by having the second mirror 44. This half lens embodiment can be made to work at magnifications different from unity, but in this case, the mirror 44 in the object space would be at a different distance from mirror 43 than the one in the image space, all as explained in connection with FIG. 1.

Figure 6:
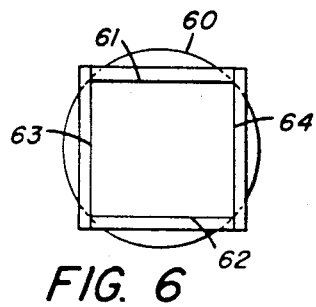
FIGS. 6 and 7 are an end view and a perspective view respectively, of an embodiment of the invention employing a square light channel.
Figure 7:
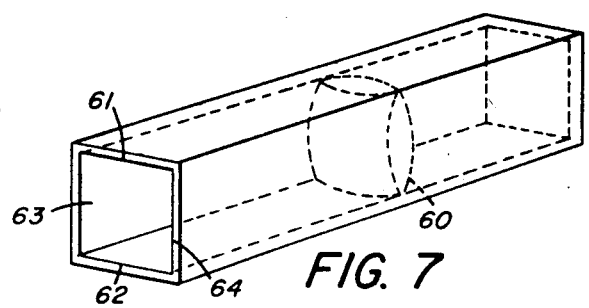

In the arrangement shown in FIGS. 6 and 7, an objective lens 60 is positioned with its optic axis centrally located in a square tube made up of plane reflectors 61, 62, 63 and 64. These reflectors act in pairs in exactly the same way as reflectors 23 and 24 do in FIG. 2. It is possible in this square tube for light to be reflected in the object space twice, for example by mirrors 61 and 63 and still be within the angular coverage of the lens 60. Such light is of course then reflected twice in the image space by mirrors 64 and 62 before reaching the image. Thus it would appear that the objective 60 sees not only the object itself but an array of virtual images around the object. Theoretically this would mean that nine times as much light goes through the lens as comes directly from the object to the lens. This theoretical gain is not realized in practice, for the reasons set forth above, but in any case the square tube system is quite efficient.

Figure 8:
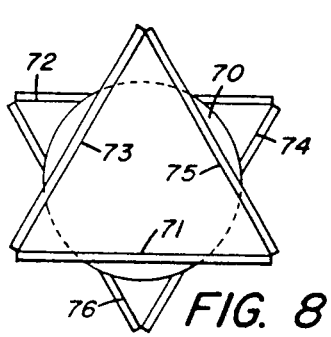
FIGS. 8 and 9 are respectively an end view and a perspective view of an embodiment of the invention employing triangular light channels.
Figure 9:
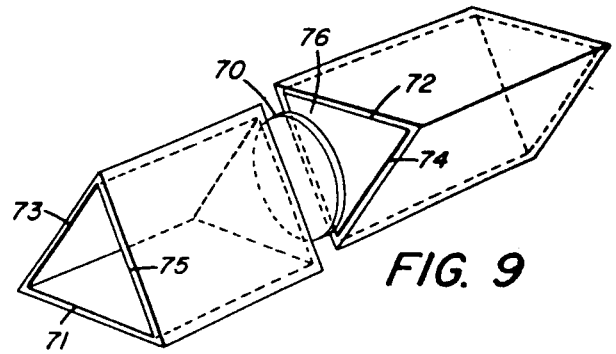

An intriguing embodiment of the invention is illustrated in FIGS. 8 and 9 in which a triangular light tube formed of three plane reflectors is used on each side of an objective lens 70. By reference back to FIG. 1 it will be seen that the reflectors 71 and 72, respectively in the object and image space, cooperate to provide a second beam of useful light. Similarly the reflectors 73 and 74 cooperate and the reflectors 75 and 76 cooperate. With an equilateral triangle there can be multiple reflections in the object space and the corresponding number of reflections in the image space without interfering with the formation of the image. However, high and costly precision is required in the triangular embodiments and they do not appear to have any major advantage over square tube embodiments.

Figures 10, 11:
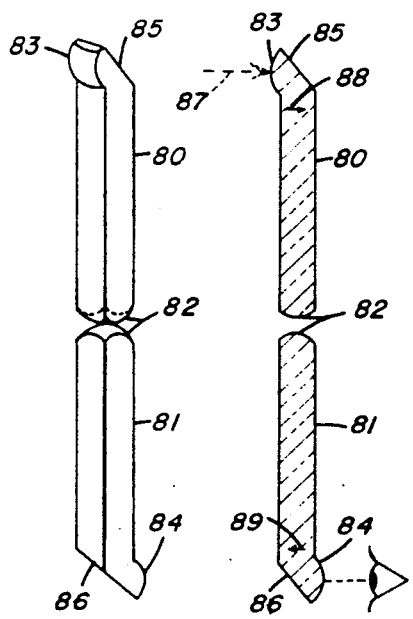
FIGS. 10 and 11 are respectively a perspective view and a diagrammatic sectional view of an optics system similar to that of FIGS. 6 and 7 as it might be embodied in a periscope.

One particularly simple application of the square tube principle forms an inexpensive periscope. As shown in FIGS. 10 and 11, the invention is applied to the relaying of one image to form a second image rather than to the formation of the first image of an object. The two parts of the periscope are symmetrical and can be made directly by the molding of plastic. Since the lens of the system actually works at a small relative aperture (made more efficient by the invention), a simple molded relay lens is satisfactory. A periscope necessarily covers only a small field, but the size of the field can be selected at will providing the necessary corrections are present since the first image is relatively near the first objective of the system.

The periscope is made of two identical internally reflecting bars 80 and 81, the end of each bar being convexly curved and the convex ends facing each other forming a biconcave air lens with surfaces 82. This acts as a positive lens since it is made up of two positive surfaces, which may be spherical or, for better correction, aspherical. The upper end of the bar 80 includes on one side a molded positive lens 83 and on the other side a reflecting surface 85. Light received from a distant object, not shown, is focused by the lens 83 and reflected by the internally reflecting surface 85 to form a real image 88 relatively near the entrance window of the periscope. Light from this image is directly focused by the air lens 82 to form a relay image 89. The amount of light reaching this image 89 is increased, according to the present invention, by the internally reflecting plane sides of the square bars 80 and 81. Light from this image 89 is then reflected by the surface 86 to an eyepiece 84 which substantially collimates the light for viewing. The system is symmetrical; the objective 83 and the eyepiece 84 are substantially identical. For clarity, the housing of the instrument is not shown in FIGS. 10 and 11, the only precision required is to be sure the square bars 80 and 81 are properly aligned, i.e., that the four sides of one bar are respectively coplanar with the four sides of the other bar. In view of the symmetry, the light in the air lens 82 is collimated and hence the thickness of this air lens, i.e., the separation of the two units, is not critical.

Assuming the periscope is to be used to look at distant objects the image 88 is at the focal plane of the lens 83. This image 88 is also at the focal plane of the surface 82. Thus the surfaces 83 and 82 are optically separated by approximately the sum of their focal lengths.

In FIG. 11, the invention provides highly efficient formation of the image 89 whose "object" is the first image 88. Thus the term "object" has its customary meaning to include the original subject or a real image which is focused or relayed to form an "image."

This embodiment of the invention is directly applicable to higher quality periscopes. In this case additional lenses are included in one or more of the focusing units, i.e., the objective 83, the relay 82 and/or the eyepiece 84 may include additional refracting surfaces.

The two co-filed applications referred to above describe various other embodiments of the present invention. The invention is not limited to any specific arrangement herein described but is of the scope of the appended claims.

I claim:
1. An efficient optical system having an optic axis comprising focusing means for receiving a first beam of light from a real object positioned in one of the conjugate planes of the focusing means and for forming a real image of the object in the other conjugate plane of the focusing means,
   a first plane reflector arranged in spaced, parallel relation to the optic axis and in relation to one side of the focusing means with one end thereof terminating at about the one conjugate plane for receiving a second beam from the object and with a single reflection thereof directing the second beam into the focusing means, and
   a second plane reflector arranged in spaced, parallel relation to the optic axis on the opposite side of the focusing means and to said first plane reflector with an end thereof terminating at about the other conjugate plane for receiving the second beam from the focusing means and with a single reflection thereof directing the second beam into focused register with the real image.

2. A system according to claim 1 in which the focusing means is an objective and the first plane reflector is on the object side of the objective and the second plane reflector is on the image side of the objective.

3. A system according to claim 2 in which the image is at unit magnification and in which the first and second plane reflectors are parallel to each other, equally spaced from the optic axis of the objective and extend on both the object and image sides of the objective.

4. A system according to claim 2 in which there is a plurality of first plane reflectors on the object side of the objective arranged about and in equally spaced, parallel relation to the optic axis, each for receiving a beam from the object, and an equal plurality of second plane reflectors on the image side of the objective arranged in equally spaced, parallel relation to the optic axis, each being axially aligned with a respective one of the first plane reflectors for receiving and reflecting the beam from its corresponding first plane reflector into focused register with the real image.

5. A system according to claim 4 in which the real image is at unit magnification and in which four reflectors are arranged to form a square tube that is symmetrical about the optic axis and extend on both the object and image sides of the objective.

References Cited

UNITED STATES PATENTS

| 3,409,354 | 11/1968 | Frank | 350—96 |
|---|---|---|---|
| 3,439,971 | 4/1969 | Van Vliet | 350—96 |
| 1,577,388 | 3/1926 | Twyman. | |
| 2,887,935 | 5/1959 | Scott et al. | |
| 3,170,980 | 2/1965 | Pritchard. | |
| 3,380,335 | 4/1968 | Clave et al. | 350—203 |

DAVID SCHONBERG, Primary Examiner

R. J. STERN, Assistant Examiner

U.S. Cl. X.R.

350—52, 96, 293